May 14, 1940.  G. E. BEHARRELL ET AL  2,200,830
CONTROL VALVE FOR HYDRAULIC SYSTEMS AND APPARATUS
Filed March 31, 1939  2 Sheets-Sheet 1
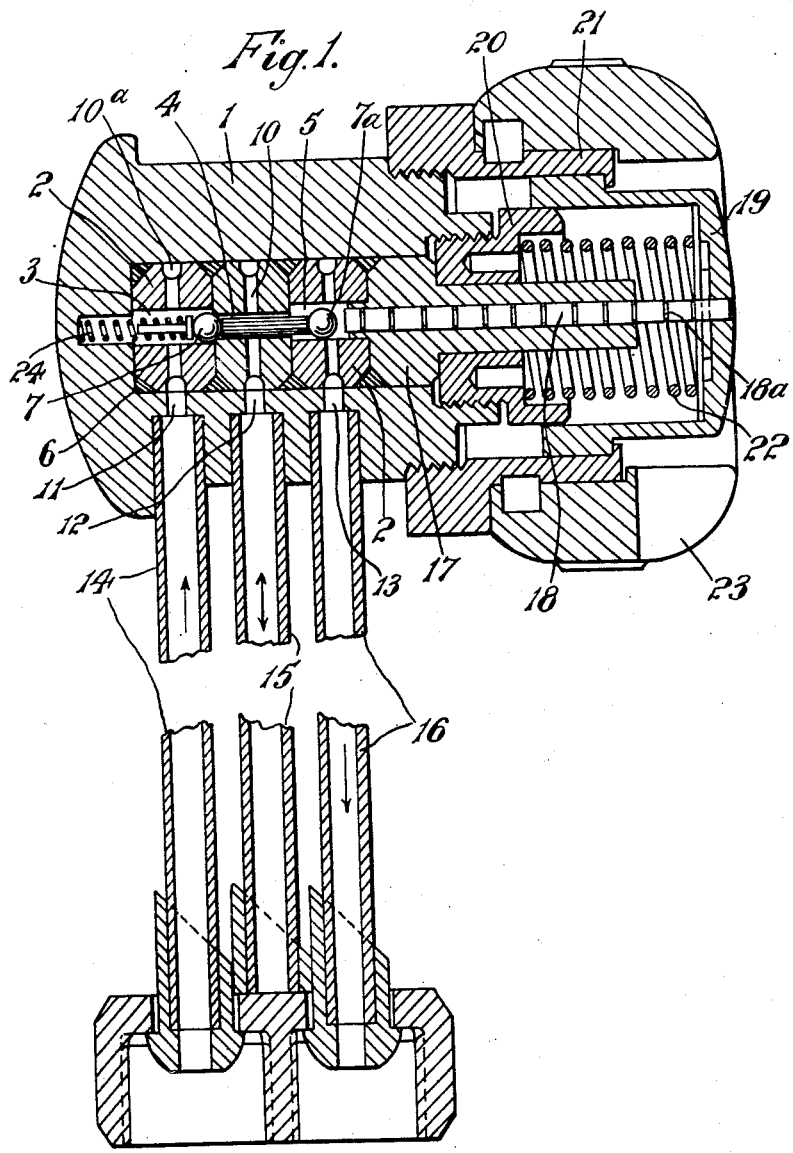

May 14, 1940.  G. E. BEHARRELL ET AL  2,200,830
CONTROL VALVE FOR HYDRAULIC SYSTEMS AND APPARATUS
Filed March 31, 1939  2 Sheets-Sheet 2
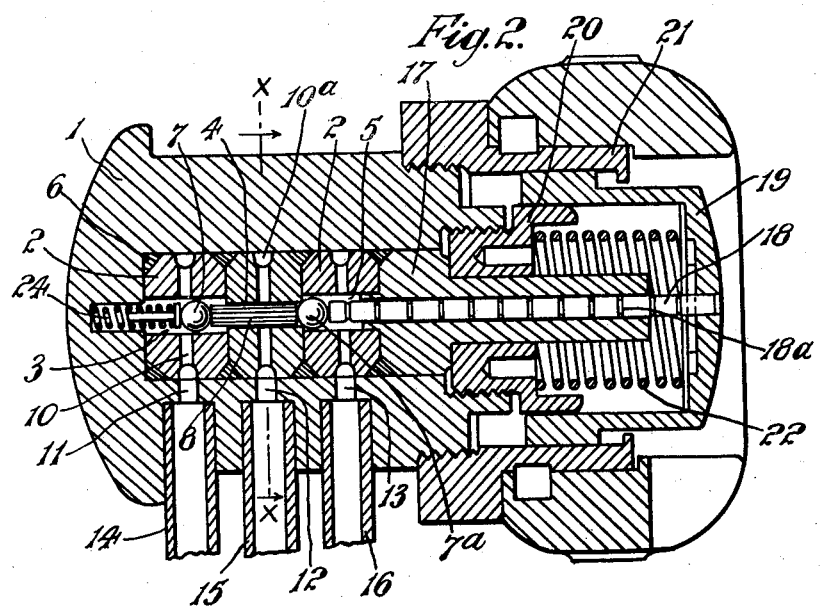
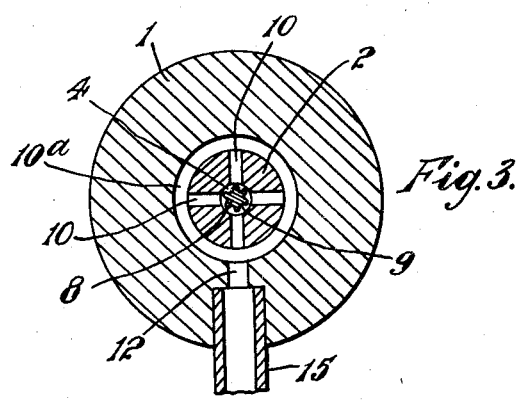
Inventors
George Edward Beharrell
Joseph Wright
Henry Trevaskis
by Benj. T. Hauber, their attorney Patented May 14, 1940

2,200,830

UNITED STATES PATENT OFFICE 2,200,830

CONTROL VALVE FOR HYDRAULIC SYSTEMS AND APPARATUS

George Edward Beharrell, Streetly, Joseph Wright, Stoke Park, and Henry Trevaskis, Sutton Coldfield, England, assignors to Dunlop Rubber Company Limited, London, England, a British company Application March 31, 1939, Serial No. 265,370
In Great Britain April 1, 1938

3 Claims. (Cl. 277—21)

This invention relates to a control valve for hydraulic systems and apparatus, more particularly to apparatus such as that used to control machine guns, and is an improvement in, or modification of, the invention set forth in our British Patent No. 469,050.

The present invention provides a control valve or device which is of simple construction, easily assembled, and which will withstand high hydraulic pressure without liability of leakage.

According to our invention, a control valve for use with hydraulically operated systems and apparatus for operating machine guns and other apparatus is characterized by an arrangement in which the supply of liquid under pressure is normally cut off from the apparatus to be hydraulically operated by means of a valve member which is in one position, held on its seat by the pressure of the liquid with or without additional spring pressure to thereby seal a conduit which communicates with two other conduits connected respectively to said apparatus and to a liquid reservoir, whilst in another position said valve is moved off its seat to open the supply conduit and, at the same time, close the conduit leading to the reservoir.

According to this invention also, the axially displaceable valve member of the control valve for hydraulically operated systems and apparatus comprises a pair of balls or the like which are separated by a distance piece or member, said valve member being constructed and arranged so that, in one position one ball, or the like, seals one end of a conduit which communicates with two other separate conduits leading respectively to the apparatus to be operated and a liquid reservoir, to thereby cut off said conduits from a supply of liquid under pressure, and in another position of the valve member said supply conduit is open to the conduit leading to said apparatus, and the other ball, or the like, seals the end of the communicating conduit to thus prevent the pressure liquid flowing to the reservoir.

The various features of the invention are illustrated by way of example in the accompanying drawings, in which—

Fig. 1 is a central longitudinal section of an embodiment of the invention showing the control valve in its normal or closed position.

Fig. 2 is a view similar to Fig. 1, but shows the inlet valve open, and

Fig. 3 is a cross section taken at the line X—X of Fig. 2.

According to a convenient embodiment, the invention is applied to a button valve for controlling the operation of machine guns, camera guns and the like on aircraft, and the valve device is adapted to be incorporated with the handle of the chief flying control.

The valve device comprises a body member 1 which is fixed to the said handle and is bored axially from one end to receive three plug members 2, each having a hole axially therethrough to form co-axial and inter-communicating liquid conduits 3, 4 and 5, respectively. Synthetic rubber or other packing rings 6 are arranged between adjacent plugs. The hole 3 and the hole 5 through the two outer plugs are of larger diameter than the hole 4 through the center plug, and a ball valve is arranged in the bore of each outer plug. The inner ball valve 7 is lightly spring pressed onto its seat formed by the end edge of the bore 4 in the central plug member 2, whilst the other ball 7a is loosely positioned in the bore 5 of the outer plug 2. These two ball valves are held apart a distance greater than the axial length of the central plug 2 by means of a pin or length of wire, or the like, 8 which is an easy sliding fit in the bore 4 of the central plug and has a series of longitudinal grooves 9 therein to form passageways which permit liquid to flow from the bore of the inlet plug member into the bore of the center plug member, or from the center plug to the other outer plug member. Each of these plug members has a hole or holes 10 diametrically therethrough, such hole or holes intersecting the central bore of each plug, and each diametrically arranged hole opens into an annular groove 10a in the periphery of each plug 2; the grooves each register with conduits 11, 12 and 13 in the body 1, which conduits receive the ends of three separate pipes or conduits 14, 15 and 16. The pipe or conduit 14 feeding the bore of the inner valve plug is connected to a pump or pressure source supplying liquid under pressure, and such pressure normally holds the inner ball valve 7 on its seat so that the other two pipes 15 and 16 are closed to the supply, but open to the gun mechanism and reservoir, respectively.

The outer end of the bore in the valve body 1 is closed by a plug 17 having a projecting sleeve portion, and this plug and sleeve are drilled axially therethrough to slidably receive a plunger 18 which is fixed to the head of the button 19 for operating the valve unit. The plunger has a number of fine circumferential grooves 18a in its surface to ensure a tight sliding fit in the bore of the sleeve 17 and also to assist in the lubrication of the plunger. This latter plug or sleeve is held in position by a nut member 20 screwed in the forward end of the valve body 1, and the interior surface of the button 19 is slidably supported on a sleeve portion of the said nut, while the exterior surface of a flange on the inner end of the button is slidably supported by a collar 21 screwed onto the valve body, such collar having an inturned flange at the forward end which co-acts with a shoulder on the button to prevent the same moving outwardly beyond a predetermined position. The button is normally held in the outward inoperative position by means of a compression spring 22 arranged between the head of the button and the face of the nut member 20 screwed into the forward end of the valve body 1.

A cap member 23 is rotatably mounted on the exterior surface of the said button retaining collar, and this cap has a limited rotational movement and co-acts with catch means preventing depression of the plunger when the cap is in one position, and permitting depression of the plunger when the cap is in another position. This catch mechanism is substantially identical to that described in our British Patent No. 469,050.

When the button 19 is depressed the plunger 18 fixed thereto moves the outer ball valve 7a and the grooved wire 8 axially, thus causing the inner ball valve 7 to be forced off its seat, while the outer ball valve 7a is moved against its seat on the central plug member 2, and therefore the pressure liquid flows through the bore 3 of the inner valve plug, through the grooves 9 in the wire member 8 separating the two ball valves 7 and 7a, and into the intermediate pipe or conduit 15 which is coupled to the gun or like mechanism to be operated by hydraulic pressure.

When the button 19 is released, the inner ball valve 7 is urged towards its seat by the light compression spring 24, and this causes the outer ball valve 7a to be moved off its seat, so that the third pipe or conduit 16 is then opened to permit liquid to return under pressure from the gun or like mechanism through the pipe 16 to a liquid storage reservoir.

With this arrangement, liquid at high pressure can be used without fear of leakage, as the main pressure from the pump, when the guns are not being operated, is applied in an axial direction onto the surface of a ball valve which is thus tightly pressed onto its seat. There is thus no side thrust on the control valve either when the guns are in use or when they are out of use.

Various modifications may be made by those skilled in the art without departing from the invention as defined in the appended claims.

What we claim is:

1. A control valve for apparatus of the type described which comprises a cylindrical valve casing, a series of three aligned cylindrical plugs in said valve casing, each having a passage therethrough, said passages being in alignment and the passage of the intermediate plug being of less diameter than those of the end plugs to form valve seats at its opposite ends, the outer edges of said plugs being recessed, packing rings in said recesses and sealing against said casing valves in the passages of said end plugs to seat on the respective valve seats of the intermediate plug, spring pressed means to push the valve in one end chamber onto this valve seat, manually operated means to push the valve in the other end plug onto its valve seat and a pin in the intermediate plug of dimension to provide longitudinal passage therethrough and of a length to unseat one valve when the other is seated.

2. A control valve for apparatus of the type described which comprises a valve casing having a recess extending thereinto from one end, a series of three plugs in said recess, said plugs having aligned passageways longitudinally of said recess and ports communicating with said passages, the central passage being of restricted diameter and each of the end passages having a valve to seat against the ends of the central passage, resilient means to press the valve at the end of said recess onto its valve seat, a manually operable means to push the other valve onto its valve seat, a pin in said central plug to displace one valve from its valve seat when the other is seated and to permit passage through said central plug, an end member in said valve casing having a passage aligned with the passages in said plugs in which said manually operable means is mounted and means to lock said end member against said plugs to hold the latter in assembled position.

3. A control valve for apparatus of the type described which comprises a valve casing having a cylindrical recess therein and a series of three closely spaced ports extending sidewise into said recess, three aligned cylindrical plugs in, and fitting said recess, each plug having a passage extending longitudinally of said recess, said passages being aligned and the passage of the intermediate plug being of less diameter than that of the end plugs to form valve seats at each end, each said plug having a passage communicating with a corresponding port of said casing, the outer edges of said plugs being bevelled to form recesses against the cylindrical recess of said casing, gaskets confined in said recesses, a valve in each of the passages of the outer plugs and movable to the valve seat at the corresponding end of the intermediate passage to close said passage, a stem in said intermediate passage dimensioned to permit passage of air therethrough and of a length to displace one valve from its seat against the intermediate passage when the other valve is seated, a spring confined between the bottom of said recess and the nearest valve and a manually slidable stem movable against the other of said stems to displace it toward the passage of said intermediate plug.

GEORGE EDWARD BEHARRELL.
JOSEPH WRIGHT.
HENRY TREVASKIS.